(12) United States Patent
Streu et al.

(10) Patent No.: US 12,076,783 B2
(45) Date of Patent: Sep. 3, 2024

(54) DEVICE FOR THE PRODUCTION OF LEAD GRID ELECTRODES FOR LEAD ACID BATTERIES IN A CONTINUOUS CASTING PROCESS

(71) Applicants: ENGINEERING OFFICE DR NITSCHE, Kerry (IE); Martin Streu, Penig (DE)

(72) Inventors: Martin Streu, Penig (DE); Werner Nitsche, Lippstadt (DE)

(73) Assignee: Engineering Office Dr. Nitsche Ltd., Kerry (IE)

( * ) Notice: Subject to any disclaimer, the term of this patent is extended or adjusted under 35 U.S.C. 154(b) by 0 days.

(21) Appl. No.: 17/766,620

(22) PCT Filed: May 12, 2020

(86) PCT No.: PCT/EP2020/063139
§ 371 (c)(1),
(2) Date: Apr. 5, 2022

(87) PCT Pub. No.: WO2021/069107
PCT Pub. Date: Apr. 15, 2021

(65) Prior Publication Data
US 2024/0051017 A1 Feb. 15, 2024

(30) Foreign Application Priority Data
Oct. 11, 2019 (IE) ..................... 2019/0168

(51) Int. Cl.
*B22D 25/04* (2006.01)
*B22D 11/06* (2006.01)
(Continued)

(52) U.S. Cl.
CPC .......... *B22D 25/04* (2013.01); *B22D 11/0634* (2013.01); *B22D 11/064* (2013.01);
(Continued)

(58) Field of Classification Search
CPC ... B22D 11/06; B22D 11/0634; B22D 11/064; B22D 11/16; B22D 21/02; B22D 21/027; B22D 25/04
(Continued)

(56) References Cited

U.S. PATENT DOCUMENTS 4,534,404 A 8/1985 McLane et al.
4,544,014 A * 10/1985 McLane et al. .... B22D 11/0611
164/479

(Continued)

FOREIGN PATENT DOCUMENTS

WO 2018210367 A2 11/2018

OTHER PUBLICATIONS

International Search Report; priority document, mailed Aug. 25, 2020.

*Primary Examiner* — Kevin P Kerns
(74) *Attorney, Agent, or Firm* — Greer, Burns & Crain, Ltd.

(57) ABSTRACT

A device for casting electrode grids for producing lead acid batteries in a continuous casting process. The device includes a casting wheel and a casting shoe which rests on an outer circumference of the casting wheel. Liquid lead exiting the casting shoe flows into a concave mold of the casting wheel surface and is removable as a solidified lead strip. The casting shoe is made up of two or more zones, at least a first hot zone with a temperature above the melting point of lead and a second, thermally separated zone with a temperature below the melting point of lead. Cooling the lead strip from two sides (the wheel side and the shoe side) avoids columnar crystal formation and increases the casting speed to 40 meter per minute and above. Thermal isolation of the lead feeding tube avoids re-flowing of lead to a lead pot, reducing PbO formation.

5 Claims, 2 Drawing Sheets

(51) Int. Cl.
*B22D 11/16* (2006.01)
*B22D 21/02* (2006.01)
*H01M 4/73* (2006.01)

(52) U.S. Cl.
CPC ............ *B22D 11/16* (2013.01); *B22D 21/027* (2013.01); *H01M 4/73* (2013.01)

(58) Field of Classification Search
USPC ........................ 164/429, 433, 434, 479, 482
See application file for complete search history.

(56) References Cited

U.S. PATENT DOCUMENTS 4,545,422 A * 10/1985 McLane et al. ....... B22D 25/04
164/133
2021/0379653 A1 12/2021 Nitsche

* cited by examiner

DEVICE FOR THE PRODUCTION OF LEAD GRID ELECTRODES FOR LEAD ACID BATTERIES IN A CONTINUOUS CASTING PROCESS

CROSS-REFERENCES TO RELATED APPLICATIONS

This application claims the benefit of the International Application No. PCT/EP2020/063139, filed on May 12, 2020, and of the Ireland patent application No. 2019/0168 filed on Oct. 11, 2019, the entire disclosures of which are incorporated herein by way of reference.

FIELD OF THE INVENTION

The following invention is used in the manufacture of electrode grids by continuous casting for positive and negative electrodes in lead-acid batteries by means of a casting wheel and a casting shoe.

BACKGROUND OF THE INVENTION

In the case of continuous casting of lead electrodes with the aid of a casting wheel featuring an engraved grid structure and a casting shoe with which the liquid lead is fed into the lattice structure, the casting speed is widely independent of the alloy composition compared to grid punching and other currently used technologies, so that even soft lead can be processed productively. Furthermore, compared to the most widely used technologies for large-scale grid manufacturing, expanded metal and punching technology, both using rolled lead strip, the electrical current deflector of the grid, the lug, can be made thicker than the grid and also the frame or grid bars can designed with varying thickness to optimize the electrical conductivity and corrosion resistance. Corrosion, grid growth is all part of it, of the lead grid is one of the major reasons for pre-mature lead-acid battery failure. This allows to savings in the amount of lead while, at the same time, optimizing the electrical conductivity, mechanical strength and corrosion resistance in specific areas.

An example of a prior art device for a continuous casting of lead electrodes is described in the document WO 2018/210367 A2.

A typical prior art casting shoe is shown in FIG. 1 of the enclosed drawings. Up to now, all casting shoes are made from one piece of metal and are kept at a temperature above the melting point of lead in use. The casting shoe is heated up by several commonly used electrical heaters 11 to a temperature clearly above the melting point of lead, 327.5° C., controlled by thermocouples 15 to avoid solidification of lead in the area close to casting wheel, which wheel is not shown in FIG. 1, but which in use is in contact with the left side of the casting shoe in FIG. 1. The casting wheel is typically kept at a temperature below the melting point, normally between 60 and 90° C. Due to this difference in temperatures, a heat gradient in the area between the casting wheel and the casting shoe occurs. Additionally, to avoid solidification of lead and blocking of a lead flow casting tube 12, and in an orifice 14, excess heated lead is allowed to flow through the casting shoe back into a lead pot. Whenever lead contacts oxygen it will start to oxidize. The resulting PbO dross increases corrosion if it flows into the casted grid. Other currently used technologies create greater amounts of dross than the continuous casting process. Longitudinal wires of ribs 13 are necessary to avoid lead flowing against the rotation direction of the casting wheel, which rotation direction in FIG. 1 is clockwise.

The design of the known casting shoe exhibits the following major disadvantages:

The heat flow and solidification create a heat gradient from the casting wheel towards the casting shoe. The solidification takes place alongside the gradient and gives rise for columnar crystals and increases the length and number of grain boundaries. Corrosion occurs at grain boundaries. The greater the number and length of grain boundaries, the higher is the corrosion potential and grid growth. Columnar crystals favor break of the grid wires.

The flowing back of lead to the lead pot increases the amount of PbO dross. As previously mentioned, PbO dross in lead grids creates corrosion.

The machine speed is limited because cooling of the feed lead occurs only after casting on the casting wheel, because the casting shoe must remain heated above the melting point to allow for free flowing of the lead onto the casting wheel. The solidification especially of grid parts containing more lead, e.g., the lug and frame, limits the machine speed. State of the art is a maximum casting speed of less than 30 meters per minute.

SUMMARY OF THE INVENTION

Significant advantages for the continuous casting process are achieved as columnar crystals and PbO dross can be reduced or eliminated as well as the casting speed can be increased to greater than 40 meters per minute with the device according to the invention. To avoid creating columnar crystals, the solidification takes place without a one-sided gradient from the casting wheel to the casting shoe. These advantages were achieved by the different design of the casting shoe according to the invention.

The casting shoe according to the invention is a two-zone or multi-zone casting shoe regarding temperature, with at least a first zone heated up above the melting point of lead and at least a temperature-controlled second zone with a temperature below the melting point. Essential to the functioning of the casting shoe according to the invention is that the first and second zones are thermally isolated by an insulator plate of low thermal conductivity. Only the lead supply contact area of the casting shoe towards the casting wheel is not isolated, therefore reducing the heat flow due to the greatly reduced heat transfer area between casting wheel and casting shoe. On the other hand, there is a high temperature gradient and mechanical stress between first zone and second zone. To minimize the mechanical stress, nickel-iron alloys, such as INVAR®, as well as alloys with suitable low extension for the casting shoe are used, and the temperature of the casting wheel is suitably set. In this respect, the cooling liquid has to be suitable. This avoids expansion-contraction deformation of the two-zone or multi-zone casting shoe. Furthermore, this construction allows a wider range of temperature modification without causing damage to the ribs in the casting shoe, which prevent the lead flow through the engraving in the casting wheel opposite to the direction of rotation of the casting wheel.

Another solution to limit the thermal stress between the casting zone and the cooling area of the casting shoe is given by multi-zones with decreasing temperatures with regard to the first zone. Practically, the use of two or even three zones with thermal isolation in between each zone to decrease the temperature towards the casting wheel temperature avoids thermal stress causing problems. In this case, no nickel-iron alloy is necessary.

A big commercial advantage of the new casting shoe according to the invention is that it allows the operation of the casting machine at more than 40 meters per minute, which will increase the productivity by more than 33%. The reduction of the dross in the grid will be more than 80%. By reducing the amount of dross collecting in the orifices, the cost of operation of the grid casting machine will be reduced because the casting shoe will not need to be replaced for cleaning so often, therefore reducing both machine downtime and labor costs. Dross in the positive grids causes grid corrosion, which leads to pre-mature failure of the battery as well as grid growth in hot climates. To counter-act the corrosion for grids from conventional casting machines, the grids are made thicker than necessary, which adds cost to the battery. By use of grids with less dross, thinner grids can fulfill the customer demands at a reduced manufacturing cost.

Another important part of the invention is the reduction of the Bernoulli Effect in the flow of lead into the grid engraving. In the current technology, nitrogen is injected into the ribs of the casting shoe to draw off air in the ribs to avoid oxidation of lead. However, the flow of lead through the pipe creates an underpressure and draws oxygen into contact with the melted lead. The pull of gas into an area of low or underpressure is known as the Bernoulli Effect. Due to the Bernoulli Effect, the additional dross, which originates in the re-circulating of lead back to the lead pot, accumulates in the lead pot. Continuous casting machines with a two-zone or multi-zone casting shoe and no re-circulation of lead back to the lead pot reduce dross due to oxygen penetration. To further reduce any dross due to oxygen drawn by the Bernoulli Effect in the rib area, a vacuum is applied to draw the air away before melted lead comes into contact with the air.

The contact area between casting wheel and casting shoe, due to greatly reduced heat transfer area between wheel and shoe, should be as small as possible to avoid heat flow between casting shoe and casting wheel to avoid lead flow through the casting shoe being necessary in the current casting machine design.

The device according to the invention is particularly well-suited for the manufacture of lead-electrode grids with low alloy contents as well as for pure lead or pure lead-tin alloys. These alloys are particularly suitable for advanced lead-acid batteries, such as absorbent glass mat (AGM) batteries as well as higher voltage applications in automotive, motive power or energy storage applications. Calcium or strontium alloys are used as alloy components for strengthening the grid. Both alloys result in increased corrosion. Antimony, which was used in the past, leads to high water consumption and creates additional cost of ownership for maintenance. Pure lead-tin alloys have been proven to be particularly corrosion-resistant and have extremely low water consumption. Furthermore, the soft lead grid technology prevents force effects and damage to the separators, especially of glass fleece separators, such as those used in absorbent glass mat batteries.

BRIEF DESCRIPTION OF THE DRAWINGS

The invention will be more clearly understood from the following description of an embodiment thereof, given by way of an example only, with reference to the accompanying drawings, in which.

DETAILED DESCRIPTION OF THE PREFERRED EMBODIMENTS

Figure 1:
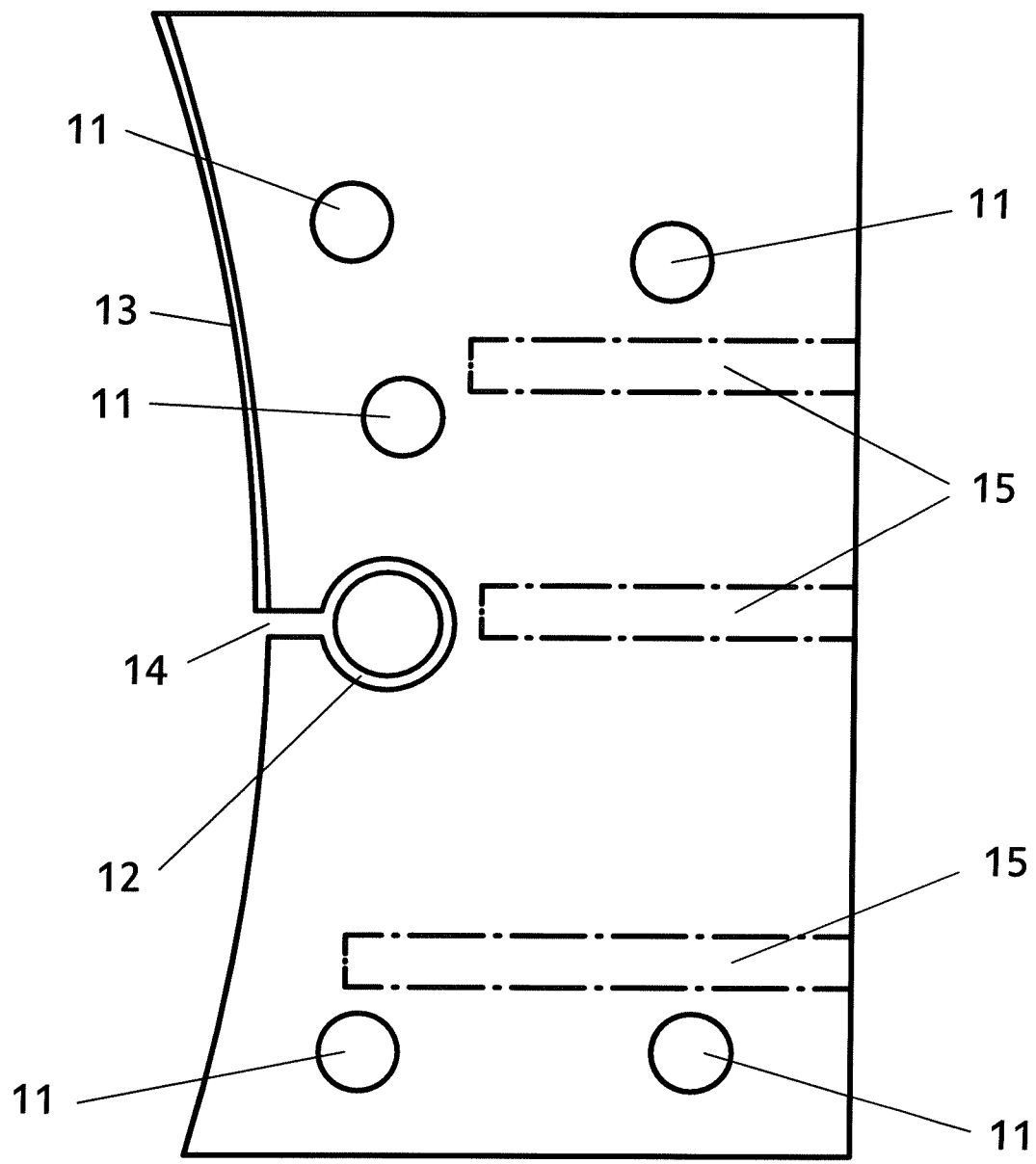
FIG. 1 shows the current design of a prior art one-zone casting shoe with heaters, casting tube, ribs, orifice and thermocouples.

The prior art one-zone casting shoe according to FIG. 1 is provided with heaters 11, a casting tube 12, ribs 13, an orifice 14 and thermocouples 15 in a known fashion, as explained above.

Figure 2:
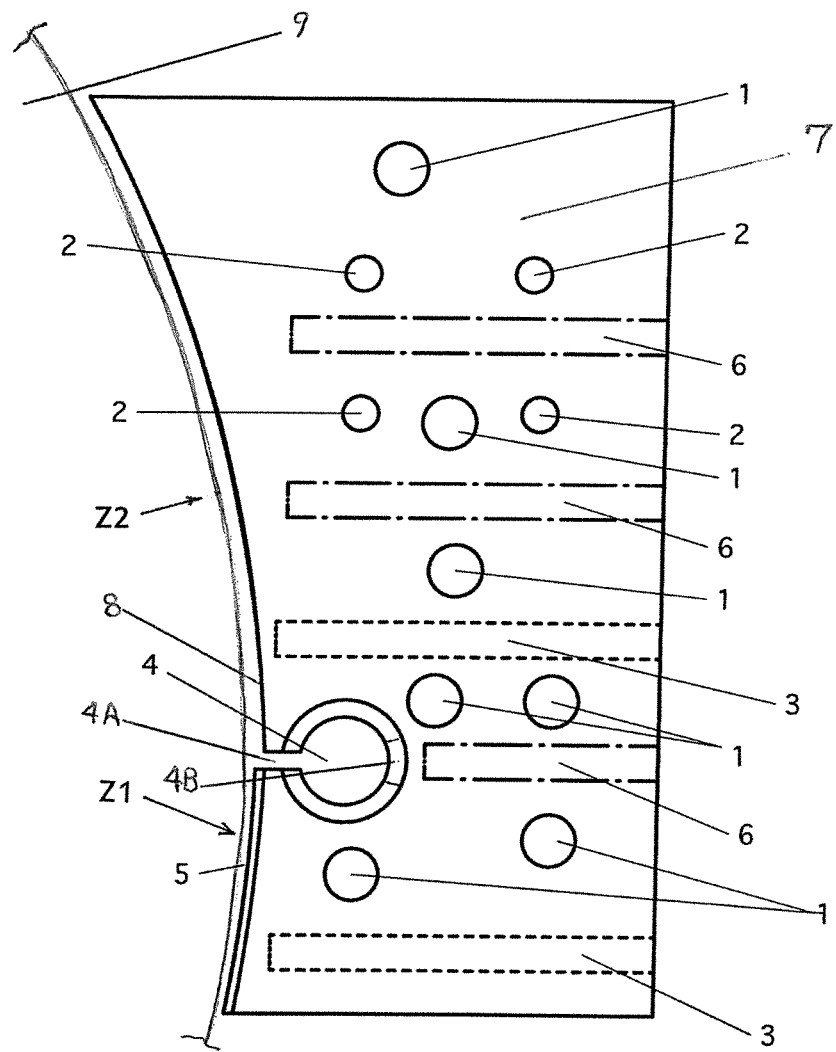
FIG. 2 shows the design of a two-zone casting shoe according to the invention, with heaters, cooling liquid drill holes, thermal isolation plate, ceramic tube with orifice, ribs and thermocouples.

The casting shoe 7 according to the invention, shown in FIG. 2, is a two-zone casting shoe regarding temperature, with at least a first zone Z1 heated up above the melting point of lead and at least a temperature-controlled second zone Z2 with a temperature below the melting point. Essential to the functioning of the casting shoe according to the invention is that the first and second zones Z1, Z2 are thermally isolated by an insulator plate 3 of low thermal conductivity. Only the lead supply contact area 8 of the casting shoe 7 towards the casting wheel 9 is not isolated, therefore reducing the heat flow due to the greatly reduced heat transfer area between casting wheel and casting shoe. Preferably, the first zone Z1 is heated up by electrical heaters 1. Heating by heated oil or inductive heating is also possible. The temperature of the second zone Z2 must be kept below the melting point of lead. Water or other liquids, circulating in cooling liquid drill holes 2, can be used to keep the temperature to the desired value. The second zone Z2 is preferably kept at the same temperature as the casting wheel 9 shown positioned on the left side of the casting shoe 7, to achieve a symmetric cooling of the lead from both sides. To control the set temperatures, sensors to measure the temperature are used, preferably thermocouples 6.

Longitudinal wires of ribs 5 on the surface of the first zone Z1 of the casting shoe 7, facing the casting wheel 9, avoid lead flowing against the rotation direction of the casting wheel, which is counter-clockwise in FIG. 2.

Another important part of the invention is the use of a ceramic tube 4 with an orifice 4A to feed the melted lead to the orifice of the casting shoe. The ceramic tube 4 has the advantage of greatly reducing or eliminating intermetallic compounds or dross, which can agglomerate and block the filling. Agglomeration of dross and intermetallic compounds is a huge problem in existing casting shoes with the current technology, which use metal pipes with front holes towards the orifice. In the current technology, most of the lead is flowing through the pipe and goes back to the lead pot and only a portion penetrates the orifice 4A and goes to the casting wheel 9 to solidify as the lead grid. Not only does the re-circulation of the lead waste energy, but also the flow of the lead introduces more chances for buildup of dross. With the ceramic tube 4 in the casting shoe according to the invention, the agglomeration of dross from the metal tube, as well as the buildup of dross from the reflow of lead, can be greatly reduced or eliminated. It is of advantage to bring an additional electric heater 4B into the ceramic tube 4 from the opposite side of the lead inlet side of the casting shoe. With the additional heater 4B, the lead is heated up to a temperature, which can be different from the hot areas in zone Z1 of the casting shoe. Zone Z1 will be kept above the melting point of lead but the ceramic tube 4 with an additional heater inside can be kept at a lower temperature than in the current design of casting shoes as depicted in FIG. 1.

The new casting shoe according to the invention can be used for clockwise as well as counter-clockwise running casting wheels. FIG. 2 shows the design for counter-clockwise operation of the casting wheel. In this case, the first, heated zone Z1 is on the lower side. For a clockwise running casting wheel, the first, heated zone Z1 would be located on the upper side of the casting shoe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

| Numeral | Designation |
| --- | --- |
| 1 | electrical heaters |
| 2 | cooling liquid drill holes |
| 3 | thermal isolation plate |
| 4 | ceramic tube |
| 4A | orifice |
| 4B | heater |
| 5 | ribs |
| 6 | thermocouples |
| 7 | casting shoe |
| 8 | lead supply contact area |
| 9 | casting wheel |
| 11 | heaters |
| 12 | casting tube |
| 13 | ribs |
| 14 | orifice |
| 15 | thermocouples |
| Z1 | first zone of casting shoe |
| Z2 | second zone of casting shoe |

The invention claimed is:

1. A device for production of lead grid electrodes for lead acid batteries in a continuous casting process, said device comprising a casting wheel with an engraved lead grid structure, and
a casting shoe which rests on an outer circumference of the casting wheel and is configured to feed lead towards the casting wheel,
wherein the casting shoe comprises a two-zone configuration,
wherein a first zone of the two-zone configuration is configured to be heated up above a melting point of lead in order to melt lead for filling the engraved grid structure of the casting wheel,
wherein one or more thermally separated second zones of the two-zone configuration, following the first zone in a direction of rotation of the casting wheel, is configured to be kept below the melting point of lead to support solidification of a previously melted lead from a shoe side of the casting wheel, and
wherein the first and second zones are thermally isolated from each other by an insulator plate.

2. The device according to claim 1, wherein in the first zone of the casting shoe heated above the melting point of lead, in which in an area the lead is flowing through, a ceramic tube with an orifice is located.

3. The device according to claim 2, wherein in the first zone of the casting shoe heated above the melting point of lead, a separate electric heater is inserted in an area of the ceramic tube.

4. The device according to claim 1, wherein the casting shoe is configured such that there is no lead flow back through the first zone heated above the melting point of lead and afterwards back into a lead pot.

5. The device according to claim 1, wherein a material of the casting shoe is a nickel-iron alloy.

* * * * *